United States Patent [15] 3,649,945
Waits [45] Mar. 14, 1972

[54] THIN FILM RESISTOR CONTACT

[72] Inventor: Robert K. Waits, Sunnyvale, Calif.
[73] Assignee: Fairchild Camera and Instrument Corporation, Mountain View, Calif.

[22] Filed: Jan. 20, 1971
[21] Appl. No.: 107,909

[52] U.S. Cl. ..........338/309, 338/328, 156/90, 117/212, 29/620
[51] Int. Cl. ..........H01c 7/00
[58] Field of Search ..........317/234 S, 235 D; 117/212; 29/620; 156/90; 338/308, 309, 327, 328, 262

[56] References Cited

UNITED STATES PATENTS

| | | | |
|---|---|---|---|
| 2,786,925 | 3/1957 | Kahan | 338/262 |
| 3,325,258 | 6/1967 | Fottler | 338/308 |

*Primary Examiner*—E. A. Goldberg
*Attorney*—Roger S. Borovoy, Alan MacPherson and Charles L. Botsford

[57] ABSTRACT

An intermediate layer of molybdenum is interposed between the aluminum interconnect layer of a semiconductor device and a thin resistive film of nickel chromium, silicon-metal, or doped silicon to prevent a reaction between the resistive film and the aluminum layer, particularly during exposure to relatively high temperatures.

9 Claims, 1 Drawing Figure

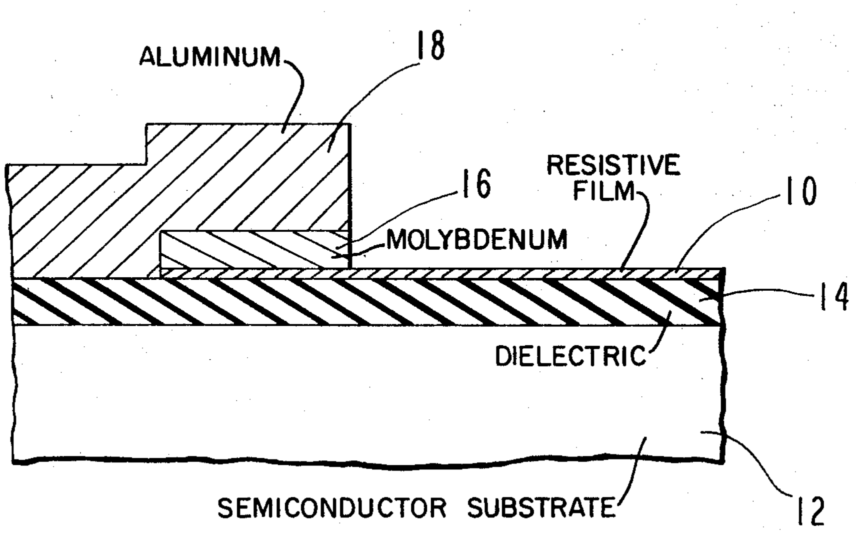
INVENTOR.
ROBERT K. WAITS
BY Charles L. Botsford
ATTORNEY

THIN FILM RESISTOR CONTACT

BACKGROUND OF THE INVENTION

1. Field of the Invention

This invention relates to a structure for and method of making ohmic contact between an aluminum interconnect layer and a thin resistive film while preventing a reaction from occurring between the resistive film and the aluminum layer, particularly at high temperatures such as above 500° C.

2. Description of the Prior Art

In the manufacture of integrated circuits and other semiconductor devices, it is desirable to provide for electrical interconnections between active elements in the device and for external contact. Interconnect layers comprising aluminum typically are located over an oxide layer that passivates the surface of the semiconductor device. Aluminum interconnect layers adhere readily to the oxide, are good conductors, and are compatible with semiconductor processing techniques.

Integrated circuit resistors often comprise thin films of resistive material located on portions of the oxide. Contact is made to the resistive film in order to connect the resistors into the rest of the circuit. The resistive-film material is selected wherein the resistors have a low thermal coefficient of expansion so that there is no substantial change in the resistance value with a change in temperature. Suitable resistive film material comprise nickel chromium, silicon-metal, or doped silicon. Unfortunately, when aluminum is placed in direct physical contact to a resistive film of nickel chromium, silicon-metal, or doped silicon, upon exposure to high temperatures, such as above 500° C., diffusion occurs between the aluminum and the resistive film.

A nickel chromium resistive film and an aluminum contact film interdiffuse rapidly at temperatures above 500° C. Resistors fabricated using an aluminum contact overlying a nickel chromium resistive film are stressed to failure by an increase in the current density. The failure occurs by burn-out at a hot spot somewhere along the resistor bar or by an arc along the resistor surface. The same resistor structure, after being heated to a temperature above 500° C. for about 20 minutes, often fails by burn-out at the vertical boundary between the aluminum and the resistor film, even though no significant increase in resistor value occurs during the heating step or prior to burn-out.

It is believed that the failure after heating is due to the reduced width of the contact area caused by submicroscopic voids (grain size, or about 50 to 100 angstroms) in the nickel chromium film adjacent to the aluminum. For example, if 90 percent of the nickel chromium grains adjacent to the aluminum boundary have diffused into the aluminum leaving a void, then the width (and cross-sectional area) of the contact has been reduced by 90 percent and the contact region can carry only 10 percent of the total current that it could carry before the diffusion occurred. The reduced contact area does not significantly increase the resistor value since the number of squares added to the resistor length (grain length divided by contact width) is negligible.

In the case of a silicon-metal resistive film such as silicon chromium, when the percentage of silicon in the film exceeds that in chromium disilicide (that is, greater than 67 atomic percent silicon), the excess silicon in the film can rapidly diffuse into the aluminum contact at temperatures exceeding 500°–550° C. In this instance, voids do not form but a low resistivity material diffuses along the resistor bar. This results in a resistor that is effectively shorter and has a total resistance value lower than the original design value. The amount of migration can vary significantly, depending upon the resistor and contact geometry, thus making it difficult to achieve target values for resistance and resistance ratios. This same problem occurs in P or N doped amorphous or polycrystalline silicon film resistors in contact with aluminum.

SUMMARY OF THE INVENTION

The structure and method of the invention provide for ohmic contact between the resistive film and the aluminum interconnection layer while preventing diffusion from occurring therebetween upon exposure to high temperature.

Briefly, the structure comprises an intermediate layer of molybdenum interposed between the thin resistive film and the aluminum interconnect layer.

BRIEF DESCRIPTION OF THE DRAWING

FIG. 1 is a simplified schematic drawing of the cross section of a portion of a semiconductor device incorporating the molybdenum intermediate layer interposed between the thin resistive film and the aluminum interconnect layer.

DESCRIPTION OF THE PREFERRED EMBODIMENT

Referring to FIG. 1, the thin resistive film 10, suitably comprises nickel chromium, silicon-metal, or doped silicon approximately 100 to 200 angstroms thick. Nickel chromium is a particularly desirable material for the resistive film compound because it has a low thermal coefficient of expansion and the resistance value of the film does not change substantially with variations in temperature. The term "silicon-metal" means a combination of silicon and a metal selected from the group consisting of chromium, molybdenum, tungsten, vanadium, niobium, tantalum, titanium, zirconium and hafnium wherein the proportion of silicon exceeds 67 atomic percent. The term "doped silicon" means silicon with an impurity concentration of P or N type dopant atoms.

The thin resistive film 10 is supported by a substrate, such as semiconductor substrate 12. Preferably, a dielectric layer 14 is located between the surface of substrate 12 and the resistive film 10. The dielectric layer 14 suitably comprises an oxide that protects and passivates the surface of the substrate 12 as well as provides electrical isolation between the substrate 12 and the resistive film 10.

The resistive film 10 is formed over the oxide 14 by one of several methods. One method comprises deposition of a resistive film on the oxide surface, then depositing a metal film for interconnections and finally, delineating both films by photomasking and etching. Another method comprises depositing a mask of an appropriate lifting material, such as copper or aluminum, over the surface. Then, the resistive film layer is deposited over the mask and the remaining exposed oxide 14. The mask is dissolved, which acts to remove the film layer thereover, leaving film strips in areas not covered by the mask.

In order to prevent diffusion between the film layer and the aluminum interconnect layer, an intermediate layer 16 of conductive material is placed over a portion of the resistive layer 10.

It has been found that molybdenum is a particularly desirable intermediate layer because it is a good conductor, it prevents or impedes diffusion between the resistive film and the aluminum layer, it does not require separate masking or etching steps and it is compatible with subsequent etching steps of the aluminum. Other refractory metals, such as tantalum, titanium, tungsten, and zirconium also impede the film-aluminum interdiffusion, but are difficult or impossible to etch with an etchant that does not also attack the resistive film and therefore require additional masking or etching steps. Suitably, layer 16 is approximately 500 to 5,000 angstroms thick.

An interconnect layer 18 is located over the intermediate layer 16. Layer 18 is in ohmic contact via layer 16 to the resistive film 10. Suitably, layer 18 comprises aluminum approximately one to one and one-half microns thick, which is the preferred material for making interconnect layers between active regions in semiconductor devices. The aluminum layer 18 is kept spaced apart from and not in direct contact with the resistive film 10 by intermediate layer 16. Thus, when the device is exposed to a relatively high temperature such as above 500° C., the resistive film 10 does not readily diffuse into the aluminum, and there is no resistive failure due to a film-aluminum reaction.

The intermediate layer 16 is conveniently formed during the lifting steps of forming the resistive film described previously. First, a suitable mask is deposited over the oxide layer. Then, the film layer and the molybdenum intermediate layer are formed over the mask and exposed portion of the oxide. Upon removing the mask, the film layer and intermediate layer also are removed, except for the portions located on the oxide. Next, a layer of aluminum is deposited over the exposed oxide, intermediate layer, and film layer. By subsequent masking and etching steps, using well-known standard photoresist techniques and an acid etchant solution containing phosphoric, nitric, and acetic acids, portions of the aluminum film and the molybdenum are removed, leaving the final structure as shown in FIG. 1. Use of molybdenum as the intermediate layer allows removal of both the aluminum interconnect layer and the intermediate layer in the same step using an etchant solution that does not attack the resistive film nor the oxide.

Alternatively, the film layer, intermediate layer, and aluminum interconnect layer may be deposited and formed into desired patterns separately using appropriate etchants, such as a hydroxide etch for the aluminum, an acid etch for the molybdenum, and ceric ammonium nitrate for the nickel chromium resistive film, or a silicon etch solution for a silicon-metal or doped silicon resistive film.

Moreover, if desired, the structure can be formed so that the aluminum layer 18 covers only a portion of the upper surface of the intermediate layer 16 rather than all of the upper portion.

In addition, it is within the scope of the invention to form a protective insulating layer over the exposed resistive film layer 10 that either covers or does not cover adjacent areas of the substrate 12.

I claim:

1. Structure comprising:

a first layer of thin resistive film material selected from the group consisting of nickel chromium, silicon-metal, and doped silicon;

a second aluminum layer located over a portion of the first layer; and a third molybdenum layer interposed between the first and second layers in order to prevent interdiffusion therebetween at relatively high temperature.

2. Structure as in claim 1 wherein the first layer comprises silicon-metal, the metal being selected from the group consisting of chromium, molybdenum, tungsten, vanadium, niobium, tantalum, titanium, zirconium, and hafnium wherein the proportion of silicon exceeds 67 atomic percent.

3. Structure as in claim 1 wherein the first layer is approximately 100 to 200 angstroms thick, the second layer is approximately 1 to 1½ micrometers thick, and the third layer is approximately 500 to 5,000 angstroms thick.

4. Structure as in claim 1 further defined by a substrate supporting the first and second layers.

5. Structure as in claim 4 wherein the supporting substrate comprises a layer of semiconductor material, the structure further defined by a dielectric layer interposed between the substrate and portions of the first and second layers.

6. Structure as in claim 5 wherein the dielectric material comprises an oxide.

7. In a structure comprising a thin film layer of resistive material with an aluminum interconnect layer located over a portion of the film layer material, the structure characterized in that an intermediate layer of molybdenum is interposed between the film layer and the aluminum layer to prevent interdiffusion between the aluminum and the film layer at relatively high temperatures.

8. Structure as in claim 7 wherein the film material is selected from the group consisting of nickel chromium, silicon-metal, and doped silicon.

9. Structure as in claim 8 wherein the film material comprises nickel chromium.

* * * * *